Nov. 4, 1969     B. K. HAWKINS     3,476,869
CONDUIT SYSTEM
Filed Nov. 21, 1967     2 Sheets-Sheet 1
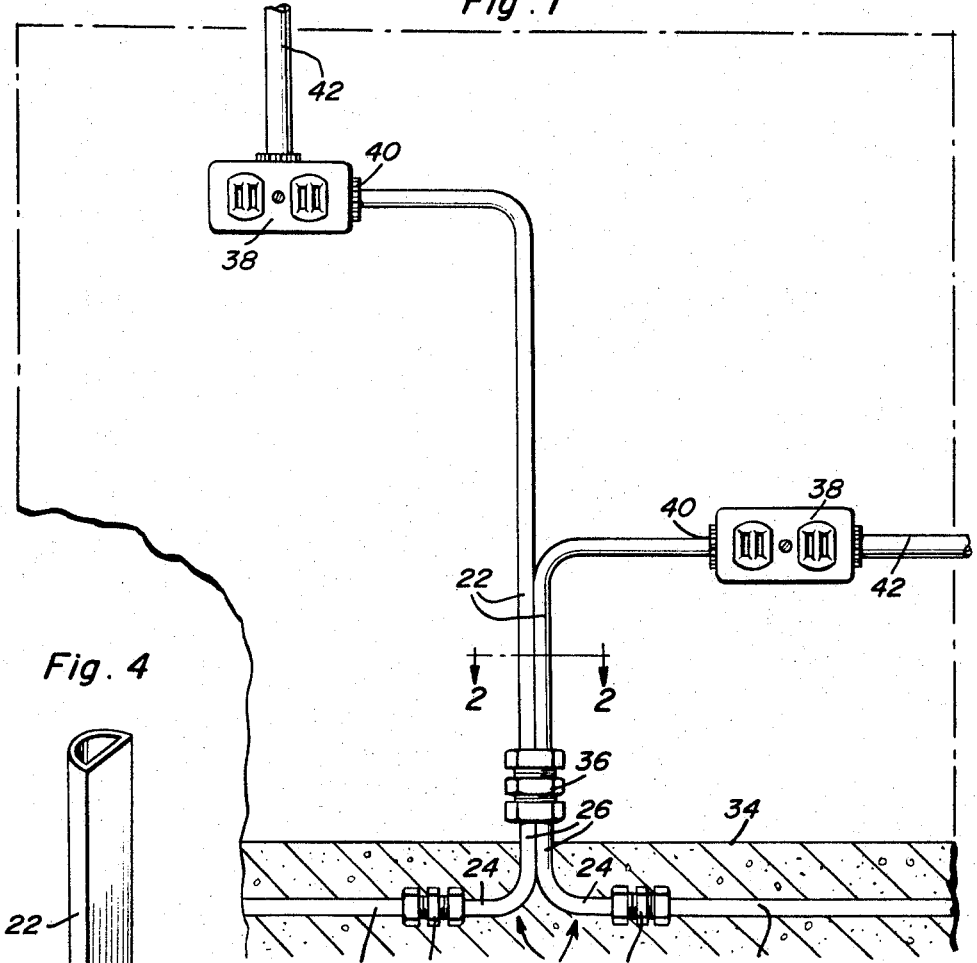
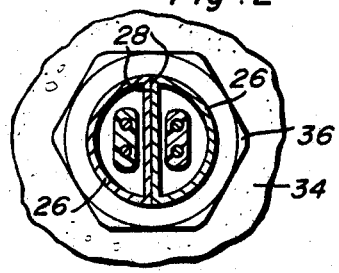
Benjamin K. Hawkins
INVENTOR.

Nov. 4, 1969   B. K. HAWKINS   3,476,869
CONDUIT SYSTEM
Filed Nov. 21, 1967   2 Sheets-Sheet 2
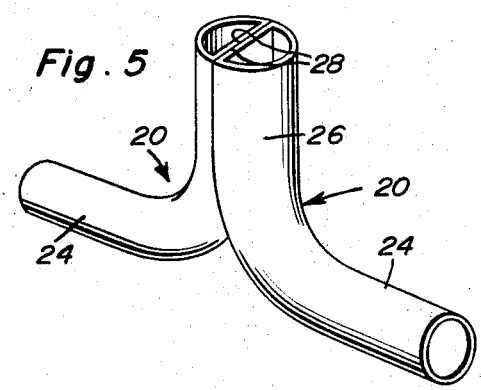
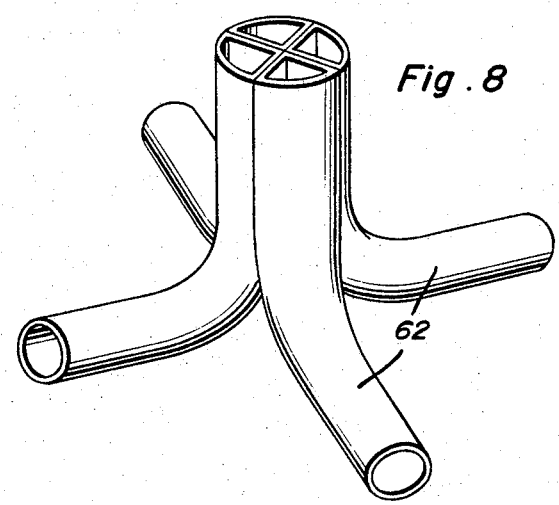
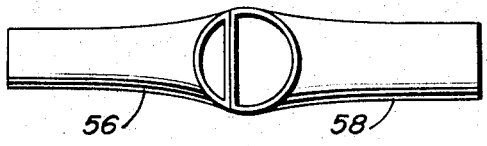
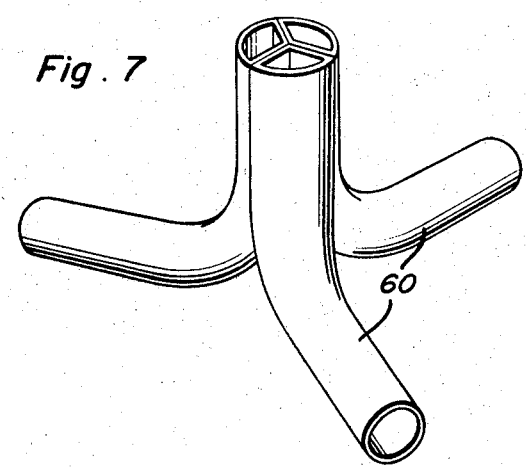
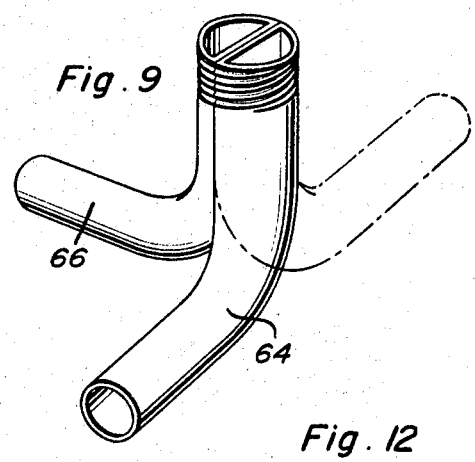
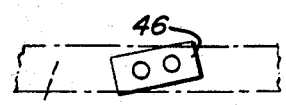
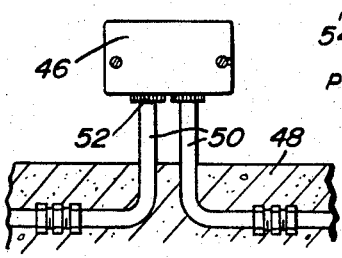 PRIOR ART
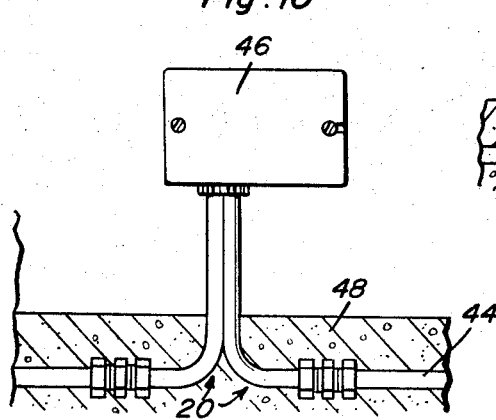
Benjamin K. Hawkins
INVENTOR.

United States Patent Office 3,476,869
Patented Nov. 4, 1969

3,476,869
CONDUIT SYSTEM
Benjamin K. Hawkins, 315 Woodlawn Drive,
Greenville, Miss. 38701
Filed Nov. 21, 1967, Ser. No. 684,732
Int. Cl. H02g 3/04
U.S. Cl. 174—68                 6 Claims

ABSTRACT OF THE DISCLOSURE

Conduit components cooperatively shaped so as to enable a juxtaposed positioning of portions thereof to achieve a common cylindrical shape corresponding in size to a conventional conduit tube for engagement of both conduit portions by a single conventional connector or coupling. The components will normally be in the nature of elbows whereby two divergent conventional conduits can be brought together and secured by a single conventional coupling or connector.

---

The instant invention is generally concerned with conduit systems, and more particularly relates to unique components for such systems which are so defined as to combine with additional similarly formed components for engagement by a single connector or coupling rather than the heretofore required use for a separate coupling or connector for each conduit.

Basically, the invention provides for complementary conduit sections or components which can approach a common point, such as a junction box, from divergent directions and combine into a single enlarged conduit shaped unit for engagement with the junction box or the like utilizing a single box knockout, thereby providing for a more exact locating of the box or connector, a faster connecting of the conduits, and a reduction in the amount of coupling pieces required.

The unique conduit components of the instant invention are formed, at the joining portions thereof, with a planar abutting inner face and an arcuate outer wall defining a predetermined portion of a circle. For example, if the component section is to mate with a single additional component section, each section will be semi-cylindrical in configuration. If four sections are to be joined, each cylindrical component will be equal to a quarter segment. While the conduit components comprising the instant invention can, as required by circumstances, incorporate the modified mating configuration along the full length thereof, the more useful adaptation of this concept will be in connection with joining elbows wherein one leg of the elbow will be of the conventional conduit shape for engagement with one of a plurality of converging conduits while the second leg of the elbow will assume the mating configuration which adapts itself for engagement with adjoining elbows in the formation of a single cylindrical unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic view of a wiring system incorporating the components of the instant invention;

FIGURE 2 is an enlarged cross-sectional view taken substantially on a plane passing along line 2—2 of FIGURE 1;

FIGURE 3 is an exploded perspective view of a pair of joining elbows constructed in accordance with the instant invention;

FIGURE 4 is a partial perspective view of a length of conduit in accordance with the instant invention;

FIGURES 5 through 9 are views illustrating the incorporation of the features of the instant invention into various slightly modified situations wherein the direction, size and number of conduits are varied; and FIGURES 10, 11 and 12 are diagrammatic views visually presenting a comparison of the herein improved junction box mounting (FIGURE 10) with the less advantageous conventional arrangement (FIGURES 11 and 12).

Referring now more specifically to the drawings, reference numeral 20 is used to designate the simplest form of elbow incorporating the concepts of the instant invention, while reference numeral 22 likewise designates a similar straight length of conduit.

As best seen in FIGURES 3 and 5, the elbow 20 includes one conventional tubular cylindrical leg 24 and one modified leg 26 which is defined by a semi-cylindrical configuration presenting a flat face 28. The flat face 28 engages against and mates with a similar face on an adjoining elbow 20 so as to produce in effect a single cylindrical configuration.

The use of such elbows 20 will be best appreciated from a viewing of FIGURES 1 and 10. Turning first to FIGURE 1, each of the elbows 20 has the conventional leg 24 thereof engaged with the adjoining end of a conventional length of conduit 30 through a conventional connector 32, while the modified legs 26 extend vertically above, as an example, a poured concrete floor 34 for a combined engagement by a single connector 36, also conventional in nature. In this manner, only one connector 36 is required. Further, only one riser appears above the floor 34, thereby simplifying the work of the floor layers, masons, tile setters, and the like which will have to work around the installed conduits.

Rising from the common connector 36 will be a mated pair of conduit sections 22, illustrated in perspective in FIGURE 4. These sections 22 will, in the manner of conventional conduits, be bent as required so as to extend to appropriate outlet boxes or the like 38 for engagement therewith by appropriate couplings 40. In the event a cylindrical configuration is required at the couplings 40, short sections from a length of conduit 22 can be inserted therein in conjunction with the main sections. The conduit 42 leaving each of these outlet boxes 38 will, unless special circumstances dictate otherwise, be of the conventional type.

With reference to FIGURE 10, it will be noted that the elbows 20 can be utilized to join converging conduits 44 with a junction box 46 above a poured floor 48 by means of a single riser unit. The significant advantages associated with such an arrangement will be best appreciated by a comparison of FIGURE 10 with the conventional installation of FIGURE 11 and FIGURE 12. The use of conventional elbows 50 requires engagement with the junction box 46 at two separate knockouts utilizing a pair of couplers 52. If the final location of the junction box 46 is to be within a wall 54 to be built subsequent to a setting of the poured floor 48 which embeds the vertically projecting elbows 50, great care must be taken to properly align the two elbows 50 so as to avoid improper alignment of the junction box 46 as suggested in FIGURE 12. This misalignment of the junction box 46 occurs frequently and is a significant problem, arising from either an error on the part of the electrician or the failure of the concrete workers to take sufficient care in working about the risers.

Utilizing the mated elbows 20 of FIGURE 10, it will be appreciated that only a single riser is provided. This single riser is less apt to be disturbed by the concrete workers as compared to two or more risers and is of an inherently greater structural stability. Further, subsequent to an actual mounting of the junction box, a rotation of the junction box 46 about the single combined conduit riser to the desired orientation can be easily effected without any bending of the conduits or the like. Incidentally, another particular advantage in being able to utilize a single knockout on the box 46 is a simplification of the measurements involved as compared to the more conventional situation wherein use of two knockouts is required to mount a pair of conduits.

FIGURES 6 through 9 illustrate the general scope of the instant invention and its adaptability to various specific installations. For example, FIGURE 6 illustrates elbows 56 and 58 particularly adapted so as to mate two dissimilar size conduits. In this instance, the mating legs include one cylindrical segment greater than a semi-circle and the other smaller than a semi-circle. FIGURE 7 illustrates joining elbows 60 for three conduits including, in each instance, a leg of a configuration corresponding to a third of a cylinder and two angularly related planar mating faces. FIGURE 8 illustrates the elbows 62 incorporating mating legs configured to correspond to a quarter of a cylinder so as to accommodate four converging conduits. FIGURE 9 illustrates a laterally directed elbow 64 wherein both elbows 64 and 66 are of the rigid tube type and would normally include threaded connector end portions. In this instance, the mating legs will have the threads formed thereon in a manner so as to, upon a bringing of these two legs together, form a composite threaded section for the accommodation of an appropriate coupler or connector.

It will be appreciated from the drawings that, in most instances, the combined legs of the mating elbows will produce a cylindrical configuration which is slightly larger in diameter than that of any one of the conventionally shaped associated legs, such being done so as to provide sufficient internal space within the individual elbows, should such be necessary. However, in each instance, it is contemplated that the combined size be such so as to enable the utilization of a conventional coupler or connector.

From the foregoing, it will be appreciated that a unique conduit system has been devised. This system, particularly related to electrical conduits, can utilize components of either the thin wall or rigid type, imperforate along the length thereof, for achieving substantial economies in materials and labor, while at the same time providing a system wherein a simplified and trouble-free installation is insured.

What is claimed as new is as follows:

1. For use in a conduit system, a conduit component, said component being imperforate along the length thereof and having at least a portion thereof partially cylindrical in configuration, said portion including a mating area engageable against a similar mating area of at least one similar configured portion to combine therewith in the formation of a composite cylindrical portion, said component comprising an elbow including two angularly directed legs, one leg comprising said partially cylindrical portion, the second leg being of a cylindrical configuration.

2. The system of claim 1 wherein said one leg is semi-cylindrical in shape, said mating area comprising a single planar face.

3. The system of claim 1 wherein said mating area comprises a pair of angularly related faces for engagement against a pair of similarly shaped adjacent portions.

4. In a conduit system, a plurality of conduits, each conduit including a first portion paralleling a similar first portion on the remainder of the conduits and being positioned thereagainst, and a second portion angularly directed relative to both the first portion and a similar second portion on the remainder of the conduits, said first portions combining in the formation of a composite unit of a configuration receivable within a single conduit securing member, said first portions including planar faces in abutting engagement with each other, and arcuate walls in circumferential alignment with each other, said arcuate walls combining to define a cylindrical configuration for the combined first portions, each first portion including a pair of angularly related planar faces in abutting engagement with two adjacent first portions.

5. The system of claim 4 wherein each second portion is of a cylindrical configuration.

6. The system of claim 5 wherein the cylindrical configuration of the combined first portions is of a greater diameter than that of the individual second portions.

References Cited
UNITED STATES PATENTS

| | | | |
|---|---|---|---|
| 338,815 | 3/1886 | Yule | 138—115 |
| 554,631 | 2/1896 | Fuller et al. | 138—115 XR |
| 1,801,091 | 4/1931 | Krauss | 285—155 |
| 2,340,926 | 2/1944 | Bradley. | |

DARREL L. CLAY, Primary Examiner

U.S. Cl. X.R.

285—137, 150; 138—111, 115; 174—49